Patented Nov. 14, 1950

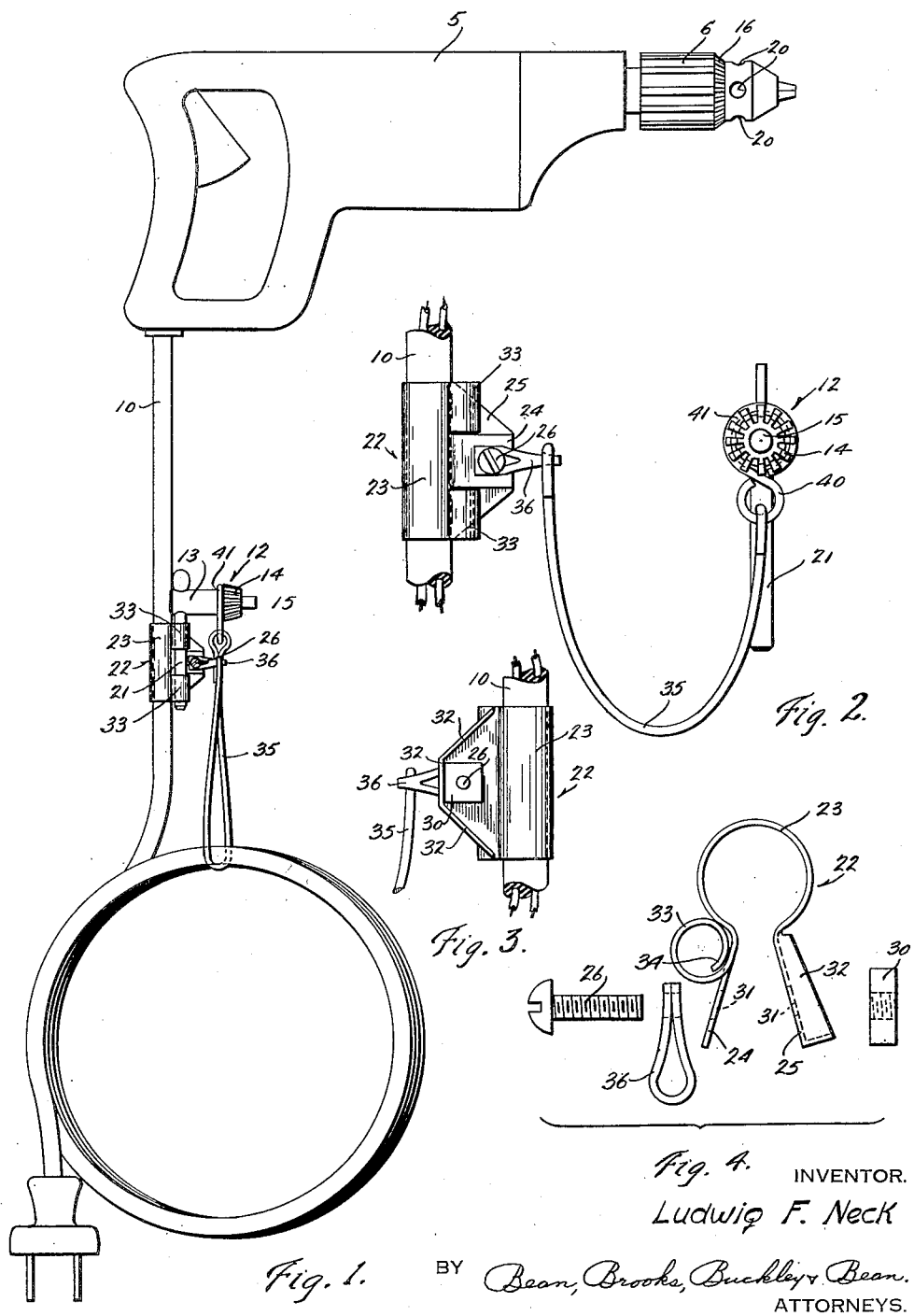

2,529,567

UNITED STATES PATENT OFFICE 2,529,567

DRILL CHUCK KEY HOLDER

Ludwig F. Neck, Kenmore, N. Y.

Application November 30, 1948, Serial No. 62,714

1 Claim. (Cl. 24—73)

My invention relates in general to a key holder, and more particularly to a holder for drill chuck pinion key.

It is well known to those skilled in the art, that when using portable drill machines such as the usual pistol grip or breast drill, the pinion key for the drill chuck used on such drills is usually placed upon a bench or other handy place after the chuck has been tightened upon the drill. When it becomes necessary to remove the drill from the chuck, the workman many times has to search for the key resulting in considerable annoyance and the loss of much time and consequent decreased production.

The principal object of my invention is to provide a conveniently mounted holder into which the key may be readily slipped after use.

Another object is to provide a holder which is permanently clamped to the electric cable extending to the motor of the drill for the ready reception of the key.

Moreover, my holder is so designed that the handle or cross bar of the key may be frictionally held in place and from which it may be readily removed when use thereof arises.

Furthermore, my invention contemplates the use of a flexible member such as a chain or the like having one end attached to the holder, and the other end pivotally secured to the body of the key, whereby the key may be permanently attached to the holder in such a manner as to permit its ready and convenient use, and by which an open ring may be formed for supporting the electric cable extending to the drill when it is rolled up in the form of a loop.

The above objects and advantages have been accomplished by the device shown in the accompanying drawings, of which:

Fig. 1 is a side elevation of a portable drill of the pistol grip type to which my invention has been applied;

Fig. 2 is an enlarged view of my key holder showing a fragmentary portion of the electric cable;

Fig. 3 is a rear view of my device; and

Fig. 4 is an exploded view showing various parts of the device.

In the drawings, I have illustrated an electric drill 5 of the pistol grip type having the usual drill chuck 6 and the electric cable 10 for conducting electricity to the motor (not shown) of the drill. As is customary, the chucks of the type illustrated in the drawings are actuated by a pinion key 12 having a body 13 at one end of which is formed the pinion 14 and a pilot 15 for engagement, respectively, with the gear teeth 16 of the chuck and any one of the apertures 20 thereof. The chuck key is also provided with the usual handle 21 which passes through the end of the body opposite the pinion and which projects from one side thereof.

My holder is represented generally by the numeral 22 which is made preferably of a single piece of sheet metal and formed with a substantially cylindrical portion 23 for clamping engagement with the electric cable 10 at a point preferably near the pistol grip of the drill. The holder is formed with two legs 24 and 25 which are flared outwardly, as shown in Fig. 4, before the device is clamped to the cable so that when these arms are drawn together by means of the bolt 26 and the nut 30, the holder will be firmly secured to the cable. Each of the legs is obviously formed with an aperture 31 for the passage of the bolt 26. So as to stiffen the leg 31, it is formed with an out turned flange 32 extending around its free edge, which has its corners cut away, as clearly shown in Fig. 3. Not only do the flanges 31 stiffen the leg 25, but one portion thereof acts as a retainer for the nut 30 to prevent its rotation when the screw 26 is being tightened.

As shown in Fig. 2, the leg 24 is relatively narrow and is located midway the ends of the cylindrical portion 23, and the metal on either side of the leg is formed into a cylindrical shaped key-receiving member 33. These key-receiving members are obviously in line with each other so that when the handle 21 of the key is inserted in one of them it will register and be engaged by the other member when the handle is moved axially into the holder. So as to prevent the key from becoming detached from the holder, the metal forming the key-receiving members 33 is rolled inwardly in the form of a circular tab 34 which is preferably free of the side edge of the member and so disposed as to have springing engagement with the key handle so as to resiliently hold it in place and to prevent its becoming detached from the holder should the cable carrying the same assume a horizontal or upside down position. If desired, that portion of each of the key-receiving members 33 which lie adjacent the cylindrical portion 23 of the holder may be secured to the holder by being brazed or otherwise fastened to thereby increase the strength of the device.

In addition to the holder for receiving the key when not is use, it is also desirable to attach the key permanently to the holder in flexible manner so that the key will be kept within reach and where it can be easily grasped without having to place it within the holder. In order to accomplish this, I attach the key at one end of a flexible member 35, the other end of which is loosely secured to a loop 36 preferably secured under the head of the bolt 26 and against the leg 31 of the holder. The outer end of the flexible member is loosely attached to a ring 40 having a circular portion 41 for engagement with the body 13 of the drill key. The portion 41 is pivotally secured to the body and held in place thereon by the pinion 14 and the handle 21.

An added feature of my invention is the use of the flexible member 35 for receiving the cable 10 when wound into a loop, as shown in Fig. 1, when the drill is not in use.

From the foregoing, it will be obvious that my holder may be clamped upon the cable leading to a drill machine of any type and may be so positioned on the cable as to be within easy and convenient reach of the operator. Because of the flexible member 35, the key does not necessarily have to be placed within the holder immediately following each time it is used since the flexible member will maintain the key in such position where the workman will be assured of finding it when it is next needed for use. Obviously, however, if desired, the handle of the key may be inserted in the key-receiving members after each time it is used. As just above indicated, when the workman has finished with the drill, the cable may be wound in an open loop, as shown in Fig. 1, and the flexible member 35 passed through the loop, after which the handle 21 may be inserted in the key-receiving members to not only hold the key in place but to hold the looped wire in convenient form.

What I claim is:

A key holder for portable drill machines and the like formed of a metal sheet shaped to provide a cylindrically shaped body part, one margin of said sheet that extends lengthwise of the cylindrical body part being divided to form spaced portions and an outwardly extending leg therebetween, a fastening means passing through said leg and the opposite margin of the sheet to clamp the body part to a support, said spaced portions being rolled to provide resilient spaced key-retaining members in registration with each other for receiving a key, and said leg being free of the key-retaining members along its opposite sides to leave the registered relation between the members undisturbed while tightening the fastening means.

LUDWIG F. NECK.

REFERENCES CITED

The following references are of record in the file of this patent:

UNITED STATES PATENTS

| Number | Name | Date |
| --- | --- | --- |
| 1,186,901 | Higgins | June 13, 1916 |
| 1,462,103 | Holywell | July 17, 1923 |
| 1,674,045 | James | June 19, 1928 |